March 11, 1947. O. LANGFELDER 2,417,170
SINGLE DRIVEN-SHAFT COMBINED BORING AND RECIPROCABLE-SAW MACHINE
Filed July 7, 1944 2 Sheets-Sheet 1
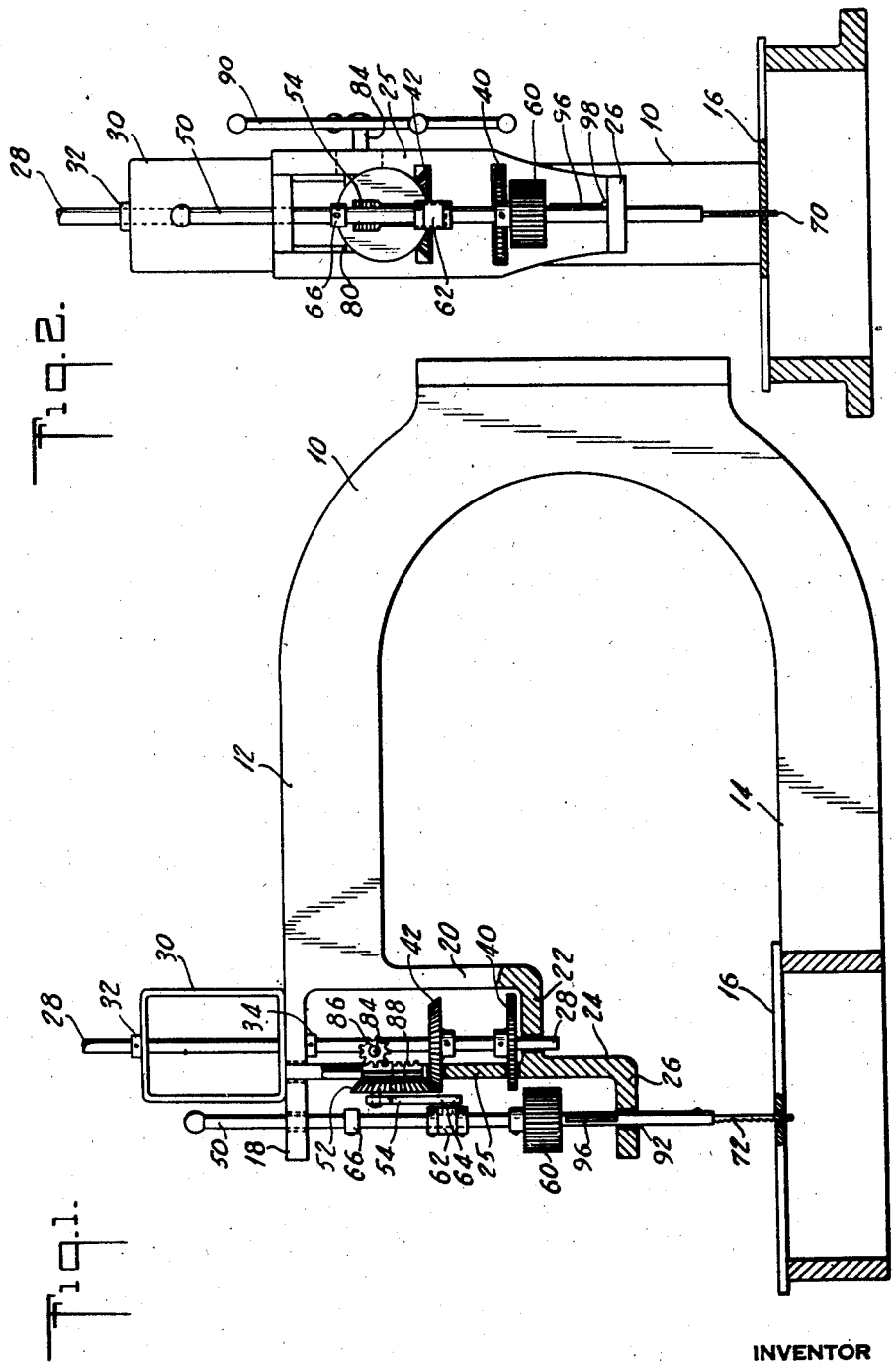
INVENTOR
OTTO LANGFELDER
BY
Schaines & Liberman
ATTORNEYS March 11, 1947. O. LANGFELDER 2,417,170
SINGLE DRIVEN-SHAFT COMBINED BORING AND RECIPROCABLE-SAW MACHINE
Filed July 7, 1944 2 Sheets-Sheet 2
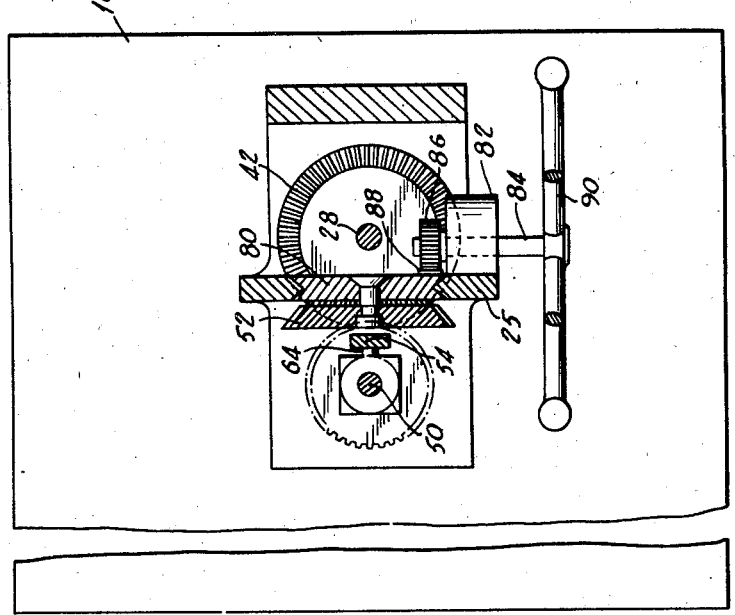
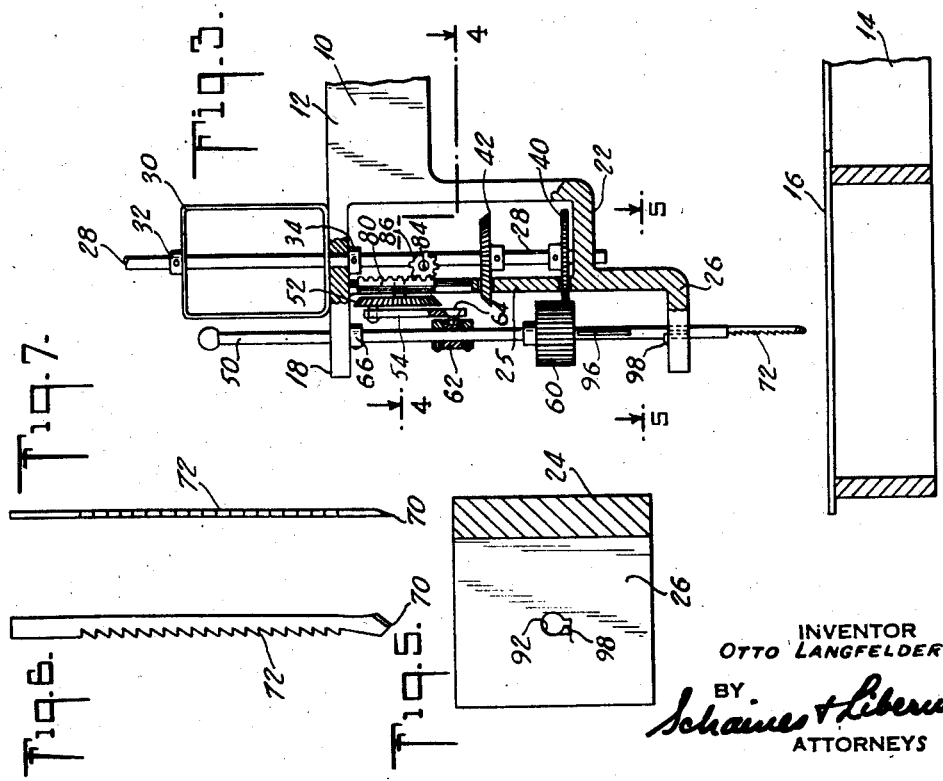
INVENTOR
OTTO LANGFELDER
BY
Schaines + Liberman
ATTORNEYS Patented Mar. 11, 1947

2,417,170

UNITED STATES PATENT OFFICE 2,417,170

SINGLE DRIVEN-SHAFT COMBINED BORING
AND RECIPROCABLE-SAW MACHINE

REISSUED

Otto Langfelder, New York, N. Y.

Application July 7, 1944, Serial No. 543,783

5 Claims. (Cl. 144—35)

My invention relates to machines known generally as jig-saws or scroll-saws. These machines are used to form designs through pieces of wood, fiber board, plywood or the like, in from the marginal edges thereof. In operation, the design is first outlined on the material to be treated, a pilot opening is made through the body of the material, and then the sawing blade is inserted and the designs sawed out. Conventional devices of this type have means for boring the hole, and means for sawing the material, and in some constructions both means have been actuated by the same source of power.

The main object of my invention is the provision of a jig-sawing machine having a single means for boring the hole and for sawing the material.

Another object of my invention is the provision of a jig-sawing machine having means for boring the hole and sawing the material, in which initial rotary movement of the hole borer is changed to reciprocating straight-line movement of the sawing means.

Another object of my invention is the provision of a jig-sawing machine in which a pair of shafts is provided, one of which rotates and the other of which is rotated and reciprocated by the first shaft.

Another object of my invention is the provision of a jig-sawing machine having a pair of shafts, one of which has a spur gear and a bevel gear thereon, rotation of said shaft causing successively rotation of the other shaft and straight-line reciprocation thereof.

Another object of my invention is the provision of a device for boring holes and sawing material.

Another object of my invention is the provision of a device which may be rotated for hole boring and reciprocated in a straight line for material sawing.

Other and further objects of my invention will, in part, be obvious from the following description of an illustrative embodiment thereof, and still other objects will be specifically pointed out hereinbelow. The scope of my invention is not to be limited except in accordance with the claims appended hereto.

In the drawings annexed hereto, forming a part hereof,

Figure 1 is a side elevational view, partly in section, of one form of device constructed according to and embodying my invention;

Fig. 2 is a front elevational view thereof, also partly in section;

Fig. 3 is a side elevational view, showing the device engaged for hole boring;

Fig. 4 is a horizontal section on the line 4—4 of Fig. 3;

Fig. 5 is a horizontal section on the line 5—5 of Fig. 3;

Figs. 6 and 7 are, respectively, side and edge elevational views of the hole borer and sawer of my invention.

My device comprises a frame 10, formed as by casting or otherwise, having a pair of horizontally extended arms 12, 14. The lower arm 14 terminates in, or is secured to, a flat-topped, work-supporting table 16. The upper arm 12 is vertically aligned with arm 14 and terminates in a shelf 18, at its upper margin, reaching out over table 16. A bracket 20 is provided, extending downwardly from the lower extremity of arm 12, having a horizontal shelf 22 parallel to shelf 18. A second bracket 24 is provided extending down from shelf 22 terminating in a shelf 26 reaching out over table 16, vertically aligned with and parallel to shelf 18. A support bar 25 is provided vertically aligned with bracket 24 extending from shelf 18 to bracket 24. Frame 10, comprising arms 12, 14, table 16, shelf 18, bar 25 and brackets and shelves 20, 22, 24, 26 may be formed all in one piece, as desired or as may be convenient.

A vertically extending shaft 28 is provided extending through vertically aligned openings in shelf 18 and shelf 22. A frame 30 is provided above shelf 80, and a pair of collars 32, 34 are mounted on shaft 28 above frame 30 and below shelf 18, to hold shaft 28 in position while permitting rotation thereof. A spur gear 40, and a bevel gear 42 are mounted on shaft 28, for rotation therewith. The gears are of such radius as to extend through bar 25, which is laterally slitted to permit the gears to extend therethrough. Any conventional means (not shown) may be provided to impart rotative movement to shaft 28 and gears 40, 42. As shown, the spur gear 40 is mounted on shaft 28 below bevel gear 42.

A second shaft 50 is provided extending through vertically aligned apertures in shelves 18, 26. Shaft 50 is suspended from a vertically disposed bevel gear 52 by a link 54, as will be detailed below. A ring gear 60 is fixed onto shaft 50. Gear 60 is substantially wider than spur 40. A collar 62 is also fixed on shaft 50, the collar permitting rotation of shaft 50 therewithin. A pin or bolt 64 holds collar 62 to the bottom of link 54, the upper end of link 54 being pivotally secured to bevel gear 52 near the marginal edge thereof. A collar 66 is fixed onto shaft 50, below shelf 18, to limit upward movement thereof.

The bottom of shaft 50 is socketed to receive and hold therewithin a combined borer and sawer device, which comprises a flat elongated blade of thin section, having a pointed end 70 and teeth 72 along an edge thereof. End 70 may be threaded, as desired, to facilitate the hole boring.

Bevel gear 52 is mounted on a plate 80, dovetailed within bar 25 and vertically slidable therewithin. A bearing 82 (Fig. 4) is fixed onto the rear of bar 25, and a shaft 84 is provided projecting laterally therethrough having a spur gear 86 on the end thereof. A rack 88 is secured to sliding plate 80, in mesh with spur 86. A number of levers, as 90, 90 are fixed to the end of shaft 84, actuation of which levers will cause rotation of shaft 84 and spur 86 and movement up and down of plate 80.

Figure 3 shows my machine ready for use. The plate 80 is racked to its upward limit, raising shaft 50 above the work-supporting table 16, and leaving a clearance between the bottom of the operating blade and table 16. Gear 60 is so positioned on shaft 50, that at the lower edge thereof it is in mesh with spur 40. As shaft 28 is rotated, as by any ordinary means (not shown), spur gear 40 is rotated along with it and rotates shaft 50. Crank arms 90, 90 are turned counter clockwisely to cause downward movement of plate 80 and shaft 50, the gears 40 and 60 remaining in mesh and both shafts rotating in opposite directions. The rotating point 72 of the blade is brought into contact with the material being worked and a hole is bored therethrough, the blade moving downwardly under the influence of the gear 86—rack 88 relative movement, until gear 60 is carried below and disengaged from spur 40.

Opening 92 through shelf 26 (see Fig. 5) is enlarged to accommodate movement of the saw blade during the reciprocating movement thereof, as will be explained below. A rib 96 is formed on shaft 50, below gear 60, extending laterally of the shaft, and a vertically extending shoulder 98 is formed on shelf 26 rising upwardly thereof, so as to form a guide for the blade during the sawing movement thereof.

As shaft 50 is brought downwardly, therefore, gear 60 is slid along spur 40 and ultimately disengaged therefrom, causing a cessation of rotation of said shaft 50. As the sliding plate 80 is carried further along on its downward path, by rotation of crank arms 90, 90, the vertical bevel gear 52 is brought into engagement with bevel gear 42 horizontally disposed on the rotating shaft 28. As gear 62 rotates, it causes vertically reciprocating movement of shaft 50, through pitman or link 54 and collar 62, the gears being held in engagement by pressure on crank arms 90, 90, and permits formation of the desired design by the sawblade edge 72.

When the desired sawing has been completed, the crank arms are rotated in a clockwise direction and the shaft 50 raised to disengage the bevel gears 42, 52, and the mechanism restored to the position of Fig. 3. Fig. 1 shows the apparatus in sawing engagement.

The main feature of my invention is the provision, in a single means, of a hole borer and sawer mechanism, to-wit, shaft 50, which rotates to bore the pilot hole or opening through the material being worked upon, and the same shaft 50 which is thereafter straight-line reciprocated to saw the desired design through the material being treated. The associated feature of my invention is the blade, which is pointed and which may be threaded at its pointed end for hole boring purposes, and which has a serrated or toothed edge or edges for sawing purposes.

My device is simple in construction and operation, and represents a radical simplification of devices for jig- or scroll-sawing.

Having now described my invention, what I claim and desire to secure by Letters Patent is:

1. In a device of the character described, a drive shaft, a driven shaft, combined boring and sawing means on the driven shaft, gear means associated with the drive shaft to rotate said driven shaft, and second gear means associated with the drive shaft, upon disengagement of the rotating means, selectively to straight-line reciprocate said driven shaft.

2. In a device of the character described, a shaft, a hole borer and sawer mounted thereon, gear means to actuate the shaft for hole boring rotation thereof, and second gear means operable upon disengagement of the rotating means, selectively to actuate said shaft for sawing reciprocation thereof.

3. In a device of the character described, a pair of vertically disposed shaft, one of which is rotatable only, a pair of gears on said first shaft, a gear on said second shaft, means to engage one of the gears on the first shaft with the gear on the second shaft to cause rotation of said second shaft, means upon disengagement of the said gear on the first shaft with the gear on the second shaft to cause engagement of the second gear on the first shaft with means connected to the second shaft to impart straight-line reciprocating movement to the said second shaft.

4. In a device of the character described, a frame, a pair of vertically disposed shafts, one of which is rotatable only, a spur gear and a bevel gear on said first shaft, a driven gear on said second shaft, and a bevel gear on said frame, a connection between the bevel gear on the frame and the second shaft, means to engage the spur gear on the first shaft with the driven gear on the second shaft to cause rotation of said second shaft, means upon disengagement of the spur and driven gears to cause selective engagement of the bevel gears to impart straight-line reciprocating movement to the said second shaft.

5. In a device of the character described, a frame, a pair of vertically mounted shafts in said frame, a spur gear on the first of said shafts, a bevel gear on said first shaft disposed at right angles thereto, a driven gear on said second shaft, a bevel gear on said frame at right angles to the bevel gear on the first shaft, a combined hole borer and sawer mounted in the bottom of the second shaft, a driven gear on said second shaft, and a connection between said second shaft and the frame-mounted bevel gear, means to engage the spur gear with the driven gear to rotate the second shaft for hole boring purposes, and means to engage the bevel gears to cause vertical reciprocating movement of the second shaft for sawing purposes.

OTTO LANGFELDER.

REFERENCES CITED

The following references are of record in the file of this patent:

UNITED STATES PATENTS

| Number | Name | Date |
|---|---|---|
| 257,309 | Ford | May 2, 1882 |
| 310,563 | Davis | Jan. 13, 1885 |
| 2,101,583 | Honneknovel | Dec. 7, 1937 |
| 2,238,578 | Burkeman | Apr. 15, 1941 |
| 403,031 | Beckwith | May 7, 1889 |
| 505,712 | Lofdahl | Sept. 26, 1893 |
| 198,426 | Stafford | Dec. 18, 1877 |
| 237,912 | Schaefle | Feb. 15, 1881 |
| 1,240,173 | Brewer | Sept. 18, 1917 |
| 1,567,341 | Swanson | Dec. 29, 1925 |
| 2,052,600 | Boss | Sept. 1, 1936 |

FOREIGN PATENTS

| Number | Country | Date |
|---|---|---|
| 384,937 | British | Dec. 15, 1932 |